Patented Mar. 13, 1951

2,544,663

UNITED STATES PATENT OFFICE 2,544,663

METHOD OF MAKING A CALCIUM HALOPHOSPHATE PHOSPHOR

David F. Fortney and Gerald L. Moran, Towanda, Pa., assignors to Sylvania Electric Products Inc., Salem, Mass., a corporation of Massachusetts No Drawing. Application September 13, 1949, Serial No. 115,551

1 Claim. (Cl. 252—301.4)

This invention relates to luminescent materials and manufacturing processes therefor, and particularly to phosphate materials such as calcium halo-phosphate.

In the preparation of such materials, chloride may be used as the halogen, and has been hitherto introduced as calcium chloride, but we find that the chloride can be better introduced as ammonium chloride. This greatly facilitates the manufacturing process, because the ammonium chloride is far less deliquescent than calcium chloride, and the mixture containing the ammonium salt has a less corrosive action on metals and metal equipment.

Other objects, advantages and features of the invention will be apparent from the following description.

In following the invention, we may take, for example the following proportions of the ingredients:

Chloride, as ammonium chloride
  ($NH_4Cl$) _____gram-atoms__ 0.35
Calcium carbonate ($CaCO_3$) _____mols__ 1.35
Secondary calcium phosphate
  ($CaHPO_4$) _____do____ 3.00
Manganese, as manganese carbonate
  ($MnCO_3$) _____gram-atoms__ 0.12
Antimony, as antimony oxide
  ($Sb_2O_3$) _____do____ 0.12
Fluoride, as calcium fluoride
  ($CaF_2$) _____do____ 0.76

We have found the above to be very satisfactory proportions for a luminescent phosphor having an emission color generally known as 3500° White, that is one having an emission curve (against wavelength) roughly similar to a black body at 3500° K. Other colors will require different proportions.

The gram-atom ratio of calcium plus manganese to phosphorus should be about 4.85 to 3.00 for maximum brightness, and a small increase in this ratio will greatly diminish the brightness of the resultant phosphor.

The ingredients are intimately mixed in the form of fine powders, for example, by starting with fine powders and milling the resultant mixture. They may then be fired, preferably in covered crucibles, at a temperature of about 1090° C. for six hours, then again broken down into powders and milled again if necessary.

When the material is fired, the ammonium chloride is apparently decomposed, the ammonium going off as a gas and the chloride combining with some of the calcium. For this reason, the amount of calcium carbonate used must be higher than that used when the chloride is supplied as calcium chloride. Our method has the advantage that there is no plain calcium chloride in the mixture up to the time of firing, and at that point, the chloride combines, not to form calcium chloride as such, but only as part of the halo-phosphate crystal. The corrosive effect and the deliquescence of calcium chloride are thus avoided.

The secondary calcium phosphate may be prepared as in the copending application of Keith H. Butler, Serial No. 25,692, filed May 7, 1948.

What we claim is:

The method of making a calcium halophosphate phosphor activated by manganese and antimony, said method comprising: intimately mixing as powders in the proportions necessary to form said halophosphate phosphor, ammonium chloride, calcium carbonate, secondary calcium phosphate, manganous and antimony salts reducible to the respective oxides, and calcium fluoride; and then firing the resultant mixture.

DAVID F. FORTNEY.
GERALD L. MORAN.

REFERENCES CITED

The following references are of record in the file of this patent:

FOREIGN PATENTS

| Number  | Country       | Date          |
|---------|---------------|---------------|
| 578,192 | Great Britain | June 19, 1946 |